(12) United States Patent
Kim

(10) Patent No.: US 10,371,470 B2
(45) Date of Patent: Aug. 6, 2019

(54) CONDENSER TUBE CLEANING APPARATUS

(71) Applicant: DOOSAN HEAVY INDUSTRIES CONSTRUCTION CO., LTD., Gyeongsangnam-do (KR)

(72) Inventor: Ki Youl Kim, Gyeongsangnam-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 380 days.

(21) Appl. No.: 15/335,068

(22) Filed: Oct. 26, 2016

(65) Prior Publication Data
US 2017/0138679 A1 May 18, 2017

(30) Foreign Application Priority Data

Nov. 12, 2015 (KR) .................. 10-2015-0159151
Nov. 12, 2015 (KR) .................. 10-2015-0159153

(51) Int. Cl.
| | | |
|---|---|---|
| F28G 1/12 | (2006.01) | |
| F28G 15/00 | (2006.01) | |
| F28G 15/04 | (2006.01) | |
| F28F 19/01 | (2006.01) | |
| B01D 35/02 | (2006.01) | |
| B08B 3/10 | (2006.01) | |
| B08B 9/057 | (2006.01) | |

(52) U.S. Cl.
CPC .............. F28G 1/12 (2013.01); B01D 35/02 (2013.01); B08B 3/10 (2013.01); B08B 9/057 (2013.01); F28G 15/003 (2013.01); F28G 15/04 (2013.01); F28F 19/01 (2013.01)

(58) Field of Classification Search
CPC .......... F28G 1/12; F28G 15/003; F28G 15/04; F28F 19/01
See application file for complete search history.

(56) References Cited

U.S. PATENT DOCUMENTS

| | | | | |
|---|---|---|---|---|
| 4,234,993 A * | 11/1980 | Kintner | ..................... | F28G 1/12 15/104.062 |
| 4,350,202 A * | 9/1982 | Schulz | ..................... | F28G 1/12 15/3.51 |
| 4,420,038 A * | 12/1983 | Okouchi | ..................... | F28G 1/12 15/3.51 |
| 4,435,285 A * | 3/1984 | Okouchi | ..................... | B04C 5/12 15/104.062 |

(Continued)

FOREIGN PATENT DOCUMENTS

| | | |
|---|---|---|
| EP | 0026261 A1 | 4/1981 |
| EP | 0458263 A1 | 11/1991 |
| JP | 60-206907 A | 10/1985 |
| JP | H01244293 A | 9/1989 |

(Continued)

OTHER PUBLICATIONS

An extended European search report issued by the European Patent Office dated Mar. 31, 2017 in connection with European application 16198083.4.

Primary Examiner — Jon T. Schermerhorn, Jr.
(74) Attorney, Agent, or Firm — Invenstone Patent, LLC

(57) ABSTRACT

Disclosed herein is a condenser tube cleaning apparatus. The condenser tube cleaning apparatus can stably circulate and collect a large number of cleaning balls to efficiently remove foreign substances accumulated in a condenser unit.

6 Claims, 13 Drawing Sheets

(56) References Cited

U.S. PATENT DOCUMENTS

| | | | |
|---|---|---|---|
| 4,554,965 A | 11/1985 | Bochinski et al. | |
| 4,556,102 A | 12/1985 | Bochinski et al. | |
| 5,176,204 A * | 1/1993 | Ben-Dosa | F28G 1/12 15/3.51 |
| 5,630,471 A * | 5/1997 | Taprogge | F28G 1/12 15/3.51 |
| 6,070,652 A * | 6/2000 | Schildmann | F28G 1/12 15/3.5 |
| 7,975,758 B2 * | 7/2011 | Ho | B08B 3/102 15/21.2 |
| 2002/0148598 A1 * | 10/2002 | Houel | F28G 1/12 165/119 |
| 2010/0236757 A1 | 9/2010 | Chou | |
| 2011/0168353 A1 * | 7/2011 | Ni | F28B 1/02 165/95 |

FOREIGN PATENT DOCUMENTS

| | | |
|---|---|---|
| JP | 04-024494 A | 1/1992 |
| JP | 5-126491 A | 5/1993 |
| JP | 5-296687 A | 11/1993 |
| JP | H0979795 A | 3/1997 |
| JP | 11-44500 A | 2/1999 |
| JP | 2876066 B2 | 3/1999 |
| JP | 2000-320998 A | 11/2000 |
| JP | 2002-350093 A | 12/2002 |
| JP | 2010-236819 A | 10/2010 |
| JP | 2014-129965 A | 7/2014 |
| KR | 1987-0000169 B1 | 2/1987 |
| KR | 19980010311 U | 5/1998 |
| KR | 20-0204310 Y1 | 11/2000 |
| KR | 10-2002-0059236 A | 7/2002 |
| WO | 2010114479 A1 | 10/2010 |

* cited by examiner

CONDENSER TUBE CLEANING APPARATUS

CROSS-REFERENCES TO RELATED APPLICATIONS

This application claims priority to Korean Patent Application Nos. 10-2015-0159151, filed on Nov. 12, 2015, and 10-2015-0159153, filed on Nov. 12, 2015, the disclosures of each of which are incorporated herein by reference in their entirety.

BACKGROUND

Exemplary embodiments of the present disclosure relate to a technology of removing foreign substances accumulated in a heat exchanger using a large number of cleaning balls, and more particularly, to a condenser tube cleaning apparatus capable of easily adjusting the flow of cleaning balls through a ball collection unit for collecting the cleaning balls.

In general, thermal power or nuclear power plants are equipped with components such as a heat exchanger or a condenser, and the heat exchanger or the condenser is equipped with a pipe unit which has a pipe shape and is hollow inside.

Coolant is supplied to the pipe unit for cooling, but various foreign substances may be accumulated in the pipe unit due to the coolant containing foreign substances. These foreign substances accumulated in the condenser are removed using a large number of cleaning balls supplied through a condenser tube cleaning system. Thus, the heat exchange performance of the condenser remains constant.

Such a condenser tube cleaning system is configured as follows. A large number of cleaning balls passing through a condenser are supplied to a foreign substance removal part, which is located at the fore end of the condenser tube cleaning system, via a strainer. The cleaning balls are supplied to coolant, from which foreign substances are removed by the foreign substance removal part, so as to remove foreign substances or residues, such as fur, which are accumulated in the pipe unit, and move from the condenser to the strainer.

In the strainer, the coolant is discharged through a separate pipe, and the cleaning balls are returned back to the foreign substance removal part.

Conventionally, a large number of cleaning balls are supplied to a condenser in a certain unit of time in order to filter foreign substances contained in coolant which is supplied to the condenser. However, when a large amount of foreign substances are accumulated in the condenser, it is difficult to stably supply the cleaning balls to remove the foreign substances.

BRIEF SUMMARY

In accordance with one aspect of the present disclosure, a condenser tube cleaning apparatus includes a condenser unit having a plurality of unit tubes in an inner region thereof, a foreign substance removal unit located at an inlet side of the condenser unit to remove foreign substances contained in coolant supplied to the condenser unit, a strainer unit configured to sort the coolant passing through the condenser unit into coolant and a large number of cleaning balls contained therein, and a ball collection unit configured to collect the cleaning balls passing through the strainer unit, wherein the ball collection unit includes a first valve installed at any position on a path of a first transfer pipe, one end of which is connected to the strainer unit while the other end thereof extends to an upper portion of the foreign substance removal unit, a pump unit spaced apart from the first valve and installed on the first transfer pipe so as to supply the cleaning balls passing through the first valve to the foreign substance removal unit, and a collection unit located between the first valve and the pump unit to collect the cleaning balls depending on switching of the first valve.

The condenser tube cleaning apparatus may include a first supply pipe, one end of which is connected to the first valve while the other end thereof is connected to an outer upper portion of the collection unit, the first valve being a 3-way valve, and a second supply pipe, one end of which is connected to an outer lower portion of the collection unit while the other end thereof is connected to the first transfer pipe in front of the pump unit.

A backflow prevention trap may be installed at a connection portion between the second supply pipe and the first transfer pipe in order to prevent the cleaning balls from flowing back to the collection unit when the cleaning balls are transferred to the foreign substance removal unit.

The first transfer pipe may have outlets, each being longitudinally spaced apart from the other end thereof extending to the upper portion of the foreign substance removal unit and being opened toward the upper portion of the foreign substance removal unit, and the outlets may include a first outlet opened at one side with respect to a separation plate, which is longitudinally arranged at an inner center of the other end of the first transfer pipe, and a second outlet opened at the other end with respect to the separation plate.

The condenser tube cleaning apparatus may include a sensor configured to detect a pressure and an amount of the coolant supplied to the condenser unit via the foreign substance removal unit, and a controller configured to selectively control a supply time and a supply amount of the cleaning balls in response to the pressure or amount of the coolant detected by the sensor.

When the pressure of the coolant is increased, the controller may determine that foreign substances are accumulated in the unit tubes of the condenser unit, and allow the pump unit to be turned on such that the cleaning balls stored in the ball collection unit are supplied to the foreign substance removal unit. When the amount of the coolant supplied to the foreign substance removal unit is increased, the controller may allow an rpm of the pump unit to be increased in order to increase a supply cycle of the cleaning balls.

In accordance with another aspect of the present disclosure, a condenser tube cleaning apparatus includes a condenser unit having a plurality of unit tubes in an inner region thereof, a foreign substance removal unit located at an inlet side of the condenser unit to remove foreign substances contained in coolant supplied to the condenser unit, a strainer unit configured to sort the coolant passing through the condenser unit into coolant and a large number of cleaning balls contained therein, and a ball collection unit configured to collect the cleaning balls passing through the strainer unit, wherein the ball collection unit includes a first valve installed at any position on a path of a first transfer pipe, one end of which is connected to the strainer unit while the other end thereof extends to an upper portion of the foreign substance removal unit, a pump unit spaced apart from the first valve and installed on the first transfer pipe so as to supply the cleaning balls passing through the first valve to the foreign substance removal unit, and a collection unit located between the first valve and the pump unit to collect the cleaning balls depending on switching of the first valve, and the condenser tube cleaning apparatus includes a second transfer pipe, one end of which is connected to the outside of the collection unit while the other end thereof is connected to any position of the first transfer pipe spaced apart from the first valve, the second transfer pipe having a smaller diameter than the first transfer pipe and being connected to an outer upper portion of the collection unit.

The second transfer pipe may be provided with a reducer, a diameter of which is decreased toward a center of the second transfer pipe in an inward longitudinal direction of a first section (L1) extending outward from a connection portion with the collection unit.

The condenser tube cleaning apparatus may further include a connection pipe, one end of which is connected to an outlet of the pump unit while the other end thereof is connected to the collection unit.

A backflow prevention trap may be installed at a connection portion between the collection unit and a connection pipe in order to prevent the cleaning balls from flowing back to the pump unit when the cleaning balls are transferred to the collection unit.

The collection unit may include a screen mesh arranged therein and having a shape corresponding to the inside of the collection unit so as to filter foreign substances contained in the coolant, and the screen mesh and the collection unit may have opening portions opened on the same line at respective sides thereof such that the cleaning balls are transferred to the pump unit.

The condenser tube cleaning apparatus may include a sensor configured to detect a pressure and an amount of the coolant supplied to the condenser unit via the foreign substance removal unit, and a controller configured to selectively control a supply time and a supply amount of the cleaning balls in response to the pressure or amount of the coolant detected by the sensor, and the controller may control the first valve such that the first valve is opened in order to move the cleaning balls to the condenser unit, and such that the first valve is closed when the cleaning balls are collected in the collection unit.

The condenser tube cleaning apparatus may include a connection pipe, one end of which is connected to an outlet of the pump unit while the other end thereof is connected to the collection unit, and a feeding part provided to additionally feed separate cleaning balls from the cleaning balls circulated in the condenser unit, the feeding part having a feeding port, one end of which is connected to any position of the connection pipe while the other end thereof is opened upward.

The feeding part may further include a cover opened and closed by rotating about a hinge provided on an upper surface of the feeding port, and the cover may have a transparent check window to observe the inside of the feeding port from the outside.

The cover may further include a fixing member provided to selectively fix the cover to the feeding port.

The condenser tube cleaning apparatus may include a cleaning ball supply unit located inside the collection unit and having a shape corresponding to the inside of the collection unit, so as to selectively supply the cleaning balls to the pump unit depending on a collected amount of the cleaning balls.

The cleaning ball supply unit may include an auxiliary collection container provided inside the collection unit, a switching port located on a lower surface of the auxiliary collection container and provided through a rotary shaft so as to be opened and closed toward an inside bottom of the collection unit, a first gear longitudinally formed on an outer peripheral surface of the rotary shaft spaced outward from the switching port, and a gear shaft, one end of which is axially inserted into an auxiliary motor located outside the collection unit while the other end thereof is formed with a second gear engaged with the first gear, for rotating the switching port.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
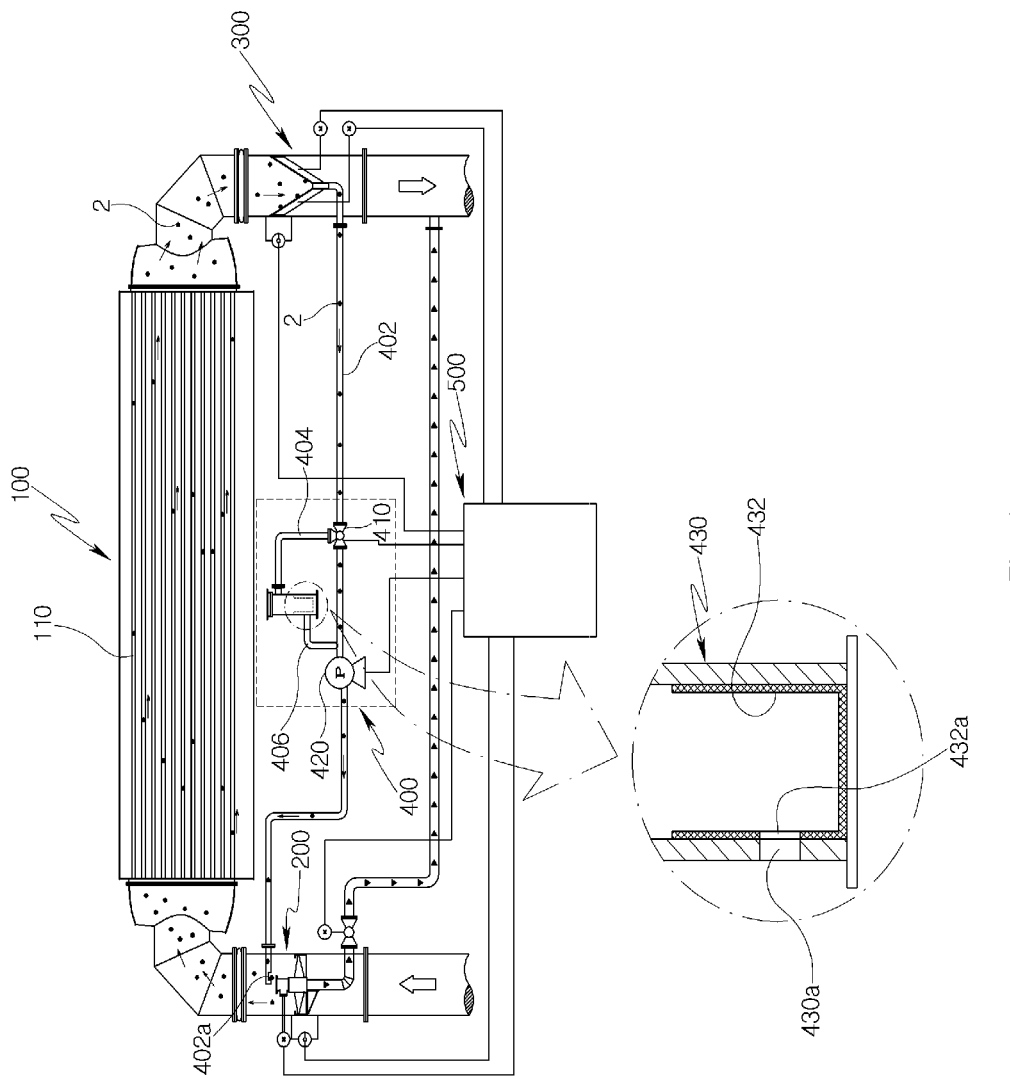
FIG. 1 is a plan view illustrating a condenser tube cleaning apparatus according to a first embodiment of the present disclosure.

An object of the present disclosure is to provide a condenser tube cleaning apparatus capable of stably circulating and collecting a large number of cleaning balls to remove foreign substances that are accumulated in a heat exchanger or a condenser unit included in a power plant.

Another object of the present disclosure is to provide a condenser tube cleaning apparatus capable of selectively supplying a large number of cleaning balls depending on a difference in flow rate of coolant, feeding of additional cleaning balls from a feeding part, or an amount of collected cleaning balls, in order to stably circulate and collect the cleaning balls to remove foreign substances that are accumulated in a heat exchanger or a condenser included in a power plant.

Other objects and advantages of the present disclosure can be understood by the following description, and become apparent with reference to the embodiments of the present invention. Also, it is obvious to those skilled in the art to which the present disclosure pertains that the objects and advantages can be realized by the apparatus and methods as claimed and combinations thereof.

Reference will now be made in detail to the exemplary embodiments of the present invention, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
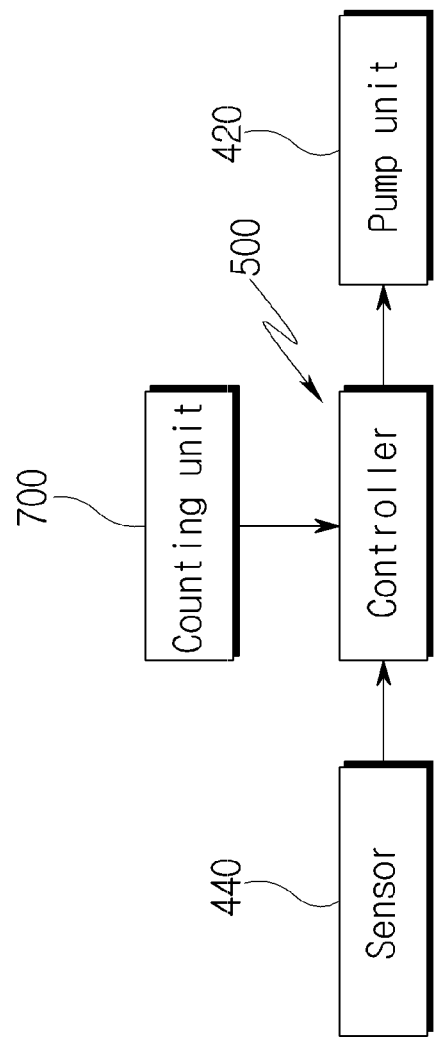
FIG. 2 is a block diagram illustrating a controller and peripheral components connected to the controller according to the first embodiment of the present disclosure.

Hereinafter, a condenser tube cleaning apparatus according to a first embodiment of the present invention will be described with reference to the accompanying drawings. FIG. 1 is a view illustrating the condenser tube cleaning apparatus according to the first embodiment of the present disclosure. FIG. 2 is a block diagram illustrating a controller and peripheral components connected to the controller according to the first embodiment of the present disclosure.

Referring to FIGS. 1 and 2, the condenser tube cleaning apparatus according to the first embodiment of the present disclosure includes a condenser unit 100 having a plurality of unit tubes 110 in the inner region thereof, a foreign substance removal unit 200 located at the inlet side of the condenser unit 100 to remove foreign substances that are contained in coolant supplied to the condenser unit 100, a strainer unit 300 configured to sort the coolant passing through the condenser unit 100 into coolant and a large number of cleaning balls 2 included therein, and a ball collection unit 400 configured to collect the cleaning balls 2 passing through the strainer unit 300.

The condenser unit 100 includes the unit tubes 110 which are axially arranged in the inner region thereof, and a large quantity of coolant moves along the unit tubes 110 in the arrow direction.

In other words, on the basis of the flow direction of coolant, after the foreign substances contained in the coolant are filtered by the foreign substance removal unit 200, the coolant is supplied to the condenser unit 100 together with the cleaning balls 2. The coolant passing through the unit tubes 110 moves downward in the arrow direction, as illustrated in the drawing, in the strainer unit 300. The cleaning balls 2 move to the ball collection unit 400 through a first transfer pipe 402 which will be described later.

The ball collection unit 400 is operated such that the cleaning balls are supplied to the upper portion of the foreign substance removal unit 200 three times a day so as to clean the condenser unit 100. For example, the cleaning balls are circulated for 2 hours to clean the condenser unit 100, and are maintained for 6 hours in the state in which they are collected in the ball collection unit 400.

Accordingly, the ball collection unit 400 accomplishes the removal of foreign substances accumulated in the unit tubes 110 while the cleaning balls 2 are repeatedly circulated and collected three times a day on a cycle of 8 hours in total.

Coolant moves from bottom to top in the foreign substance removal unit 200, and the foreign substance removal unit 200 includes a wire mesh to filter foreign substances contained in the coolant, thereby enabling the foreign substances to be minimally moved to the unit tubes 110.

The strainer unit 300 is supplied with the cleaning balls 2 and the coolant, which pass through the condenser unit 100, and the cleaning balls 2 move to the ball collection unit 400 while the coolant moves downward of the strainer unit 300 (in the arrow direction).

The first transfer pipe 402 is connected to the lower side of the strainer unit 300 such that the cleaning balls 2 are move to the ball collection unit 400.

In the embodiment, the ball collection unit 400 includes a first valve 410 installed at any position on the path of the first transfer pipe 402, one end of which is connected to the strainer unit 300 while the other end thereof extends to the upper portion of the foreign substance removal unit 200, a pump unit 420 which is spaced apart from the first valve 410 and is installed on the first transfer pipe 402 so as to supply the cleaning balls 2 passing through the first valve 410 to the foreign substance removal unit 200, and a collection unit 430 which is located between the first valve 410 and the pump unit 420 to collect the cleaning balls 2 depending on the switching of the first valve 410.

The first valve 410 is a 3-way valve, and the direction of the 3-way valve is switched by a controller 500. For example, the controller 500 controls the direction of the 3-way valve such that a large number of cleaning balls 2 are moved to the pump unit 420 in order to supply the cleaning balls 2 to the foreign substance removal unit 200.

In this case, the cleaning balls 2 are moved to the upper portion of the foreign substance removal unit 200 by the pumping force of the pump unit 420 to drop downward, and are stably moved toward the unit tubes 110 included in the condenser unit 100.

The controller 500 controls the cleaning balls 2 such that they clean the condenser unit 100 and are then guided to the collection unit 430 for the collection thereof. Here, the operation of the pump unit 420 is turned off so as to stop the supply of the cleaning balls 2 to the foreign substance removal unit 200, and the direction of the first valve 410 is switched such that the cleaning balls 2 are guided to a first supply pipe 404 connected with the collection unit 430.

When a 3-way valve is used as the first valve 410, a large number of cleaning balls 2 may be easily and selectively moved only when it is necessary to clean the condenser unit 100. Therefore, it is possible to efficiently remove foreign substances accumulated in the condenser unit 100.

The operation of the pump unit 420 is controlled by the controller 500, and the pump unit 420 may consist of a single pump unit or a plurality of pump units. When the rpm of the pump unit 420 is selectively controlled, the supply of the cleaning balls 2 to the condenser unit 100 may be differently controlled.

For example, when it is necessary to supply a large number of cleaning balls 2 to the condenser unit 100, the rpm of the pump unit 420 is controlled to be increased by the controller 500. In addition, the pump unit 420 is controlled to operate at a preset rpm unless any abnormality is detected.

The collection unit 430 includes a first supply pipe 404, one end of which is connected to the first valve 410 while the other end thereof is connected to the outer upper portion of the collection unit 430, and a second supply pipe 406, one end of which is connected to the outer lower portion of the collection unit 430 while the other end thereof is connected to the first transfer pipe 402 in front of the pump unit 420.

The first supply pipe 404 serves to move the cleaning balls 2 to the collection unit 430, and the second supply pipe 406 serves to move the cleaning balls 2 stored in the collection unit 430 to the pump unit 420.

The collection unit 430 is located between the first valve 410 and the pump unit 420, and collects the cleaning balls 2 depending on the switching of the first valve 410. The collection unit 430 has a cylindrical shape and includes a screen mesh 432 therein.

The screen mesh 432 has a wire mesh structure in order to filter foreign substances contained in coolant, and has a shape corresponding to the inside of the collection unit 430 so as to filter foreign substances contained in coolant. In addition, the screen mesh 432 and the collection unit 430 have opening portions 432a and 430a which are opened on the same line at the respective sides thereof such that the cleaning balls 2 are transferred to the pump unit 420.

The collection unit 430 includes an openable and closable cover at the upper portion thereof, and an operator may therefore check the screen mesh 432 by opening the cover if necessary.

The opening portions 432a and 430a are opened on the same line. Therefore, when it is necessary to transfer the cleaning balls 2 to the condenser unit 100, the cleaning balls 2 are stably moved through the second supply pipe 406 via the pump unit 420 by the pumping force of the pump unit 420.

For reference, the first transfer pipe 404 is provided with a counting unit 600 which may count the number of cleaning balls. The counting unit 600 transmits information on the number of cleaning balls to the controller 500, and data on the cleaning balls, which are currently moved to the ball collection unit 400, is calculated.

The other end of the first transfer pipe 402 extends toward the foreign substance removal unit 200. In this case, the end of the first transfer pipe 402 extends to the upper center of the foreign substance removal unit 200, and is formed with a single outlet 402a which is opened. Consequently, the cleaning balls 2 move to the condenser unit 100, together with the coolant passing through the foreign substance removal unit 200, while dropping downward of the foreign substance removal unit 200.

The cleaning balls 2 may remove foreign substances while moving along the unit tubes, and the efficiency of the condenser unit 100 is thus improved.

Figure 3:
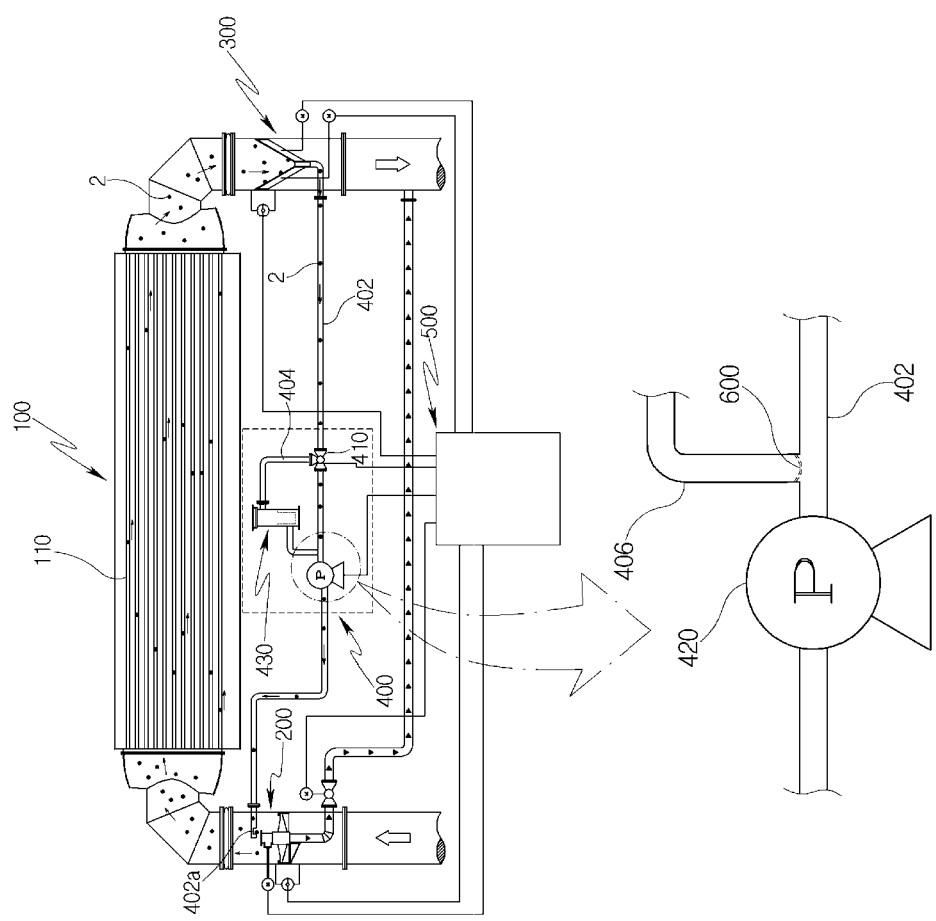
FIG. 3 is a plan view illustrating a backflow prevention trap included in the condenser tube cleaning apparatus according to the first embodiment of the present invention.

Referring to FIG. 3, a backflow prevention trap 600 is installed at the connection portion between the second supply pipe 406 and the first transfer pipe 402. The backflow prevention trap 600 serves to prevent the cleaning balls 2 from flowing back to the collection unit 430 when the cleaning balls 2 are transferred to the foreign substance removal unit 200.

The backflow prevention trap 600 is opened only in one direction toward the first transfer pipe 402 from the second supply pipe 406. Therefore, the cleaning balls 2 may be stably moved only in one direction from the collection unit 430 to the pump unit 420. In addition, since the cleaning balls 2 are not supplied or do not flow backward, the stable supply of the cleaning balls 2 can be improved.

Accordingly, since the cleaning balls 2 are moved in one direction toward the first transfer pipe 402 from the second supply pipe 406, the condenser unit 100 may be stably cleaned using the cleaning balls 2.

In addition, even when the pump unit 420 malfunctions, the cleaning balls 2 are stably moved in a predetermined direction without flowing back to the collection unit 430.

The first transfer pipe 402 has a single outlet 402a formed in the other end thereof, or may also have the following components. The description thereof will be given with reference to the drawings.

Figure 4:
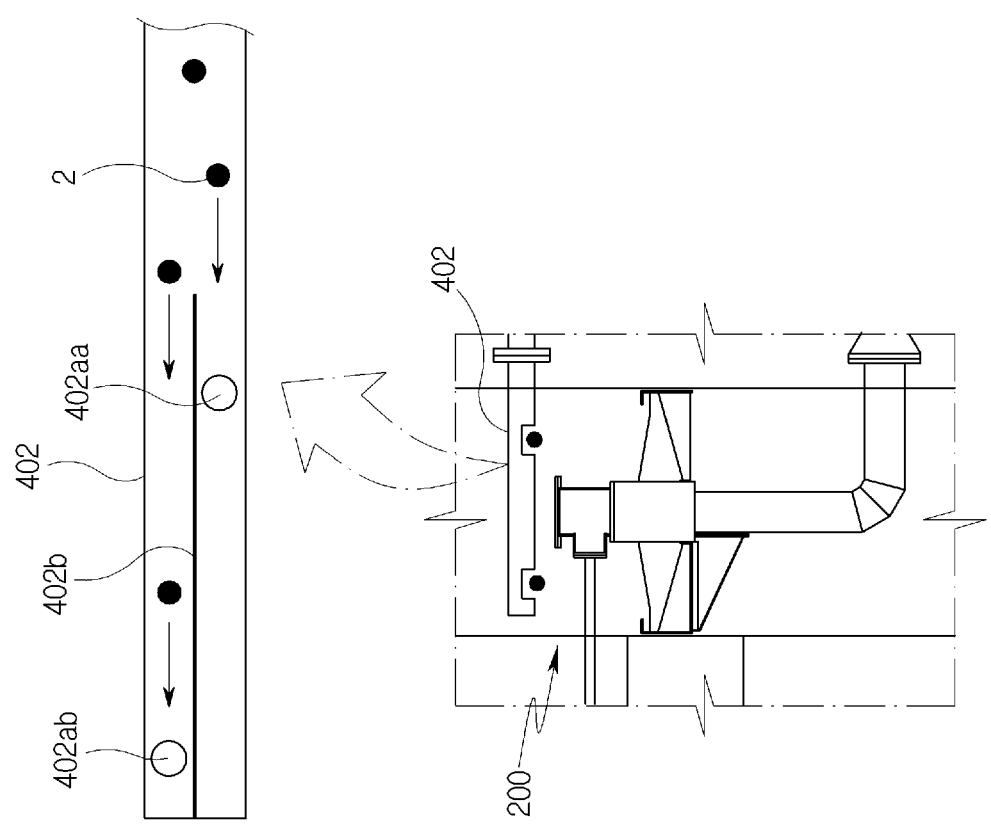
FIG. 4 is a view illustrating another example of outlets according to the first embodiment of the present disclosure.

Referring to FIG. 4, unlike the above description, the outlet 402a formed in the first transfer pipe 402 according to the embodiment includes a first outlet 402aa opened at one side with respect to a separation plate 402b, which is longitudinally located at the inner center of the other end of the first transfer pipe 402, and a second outlet 402ab opened at the other end with respect to the separation plate 402b.

The end of the first transfer pipe 402 extends to the left edge on the drawing, rather than the center of the foreign substance removal unit 200. The second outlet 402ab is opened toward the lower side of the foreign substance removal unit 200, and the first outlet 402aa is opened toward the lower side of the foreign substance removal unit 200 at the right edge on the drawing.

Thus, when the first and second outlets 402aa and 402ab are opened at the positions spaced apart from each other, the cleaning balls 2 drop through the first and second outlets 402aa and 402ab in different directions. Therefore, the cleaning balls may drop to various positions, instead of the specific position of the foreign substance removal unit 200. Consequently, since the cleaning balls are evenly dispersed when moving toward the unit tubes 110, the foreign substances accumulated in the unit tubes 110 may be stably removed.

Accordingly, the foreign substances accumulated in any unit tube disposed at a specific position are not merely removed, but the foreign substances accumulated in all of the unit tubes 110 may be removed. Therefore, efficiency in removing foreign substance can be improved.

The separation plate 402b longitudinally extends in a partial section of the other end of the first transfer pipe 402, and is located at the center of the first transfer pipe 402. The separation plate 402b may allow the cleaning balls 2 to move toward the respective first and second outlets 402aa and 402ab, thereby preventing the cleaning balls 2 from being concentrated in any one of the first and second outlets 402aa and 402ab.

The separation plate 402b extends from the other end of the first transfer pipe 402 (the position of the second outlet) to the position of the first outlet 402aa, and the first and second outlets 402aa and 402ab are diagonally located on the basis of the separation plate 402b. Therefore, a time difference when the cleaning balls 2 are supplied to the first and second outlets 402aa and 402ab occurs due to the distance between the outlets.

Accordingly, the velocities of the cleaning balls 2 dropping to the foreign substance removal unit 200 differ from each other, and the velocities of the cleaning balls 2 moving to the condenser unit 100 differ from each other, thereby reducing a collision between the cleaning balls.

Thus, since the cleaning balls 2 are dispersed without the overlapping of movement trajectories thereof, the cleaning balls 2 may be more stably moved toward the unit tubes 110 and clean the same in the condenser unit 100. Therefore, it is possible to improve cleaning efficiency and simultaneously improve the overall efficiency of the condenser unit 100.

Sensors 440 are provided to detect the pressure and amount of coolant which is supplied to the condenser unit 100 via the foreign substance removal unit 200. For example, a pressure sensor (not shown) and a flow sensor (not shown) are used as the sensors 440.

The pressure sensor and the flow sensor are each located in front of and behind the foreign substance removal unit 200, and detect the pressure and flow rate of coolant before and after the coolant passes through the foreign substance removal unit 200 so as to transmit the same to the controller 500. The controller 500 selectively controls the supply time and amount of the cleaning balls 2 in response to the pressure or amount of coolant transmitted from the sensors.

For example, when the pressure of the coolant is increased, the controller 500 determines that foreign substances are accumulated in the unit tubes 110 of the condenser unit 100, and allows the pump unit to be turned on such that the cleaning balls 2 stored in the ball collection unit 400 are supplied to the foreign substance removal unit 200.

In this case, the backflow prevention trap 600 is instantaneously opened toward the first transfer pipe 402 from the second supply pipe 406, and the cleaning balls 2 are moved toward the pump unit 420 by the pumping force of the pump unit 420. Then, the cleaning balls 2 drop downward from the upper portion of the foreign substance removal unit 200 and move to the condenser unit 100.

When the amount of the coolant supplied to the foreign substance removal unit 200 is increased, the controller 500 allows the rpm of the pump unit 420 to be increased in order to increase the supply cycle of the cleaning balls 2. In this case, since the cleaning balls 2 are supplied in proportion to the increased amount of the coolant, the foreign substances accumulated in the condenser unit 100 may be stably removed.

Accordingly, the cleaning balls 2 may be controlled to be proportionally supplied depending on variation in the amount of coolant by the controller 500, and it is thus possible to stably cope with a lot of variables.

Figure 5:
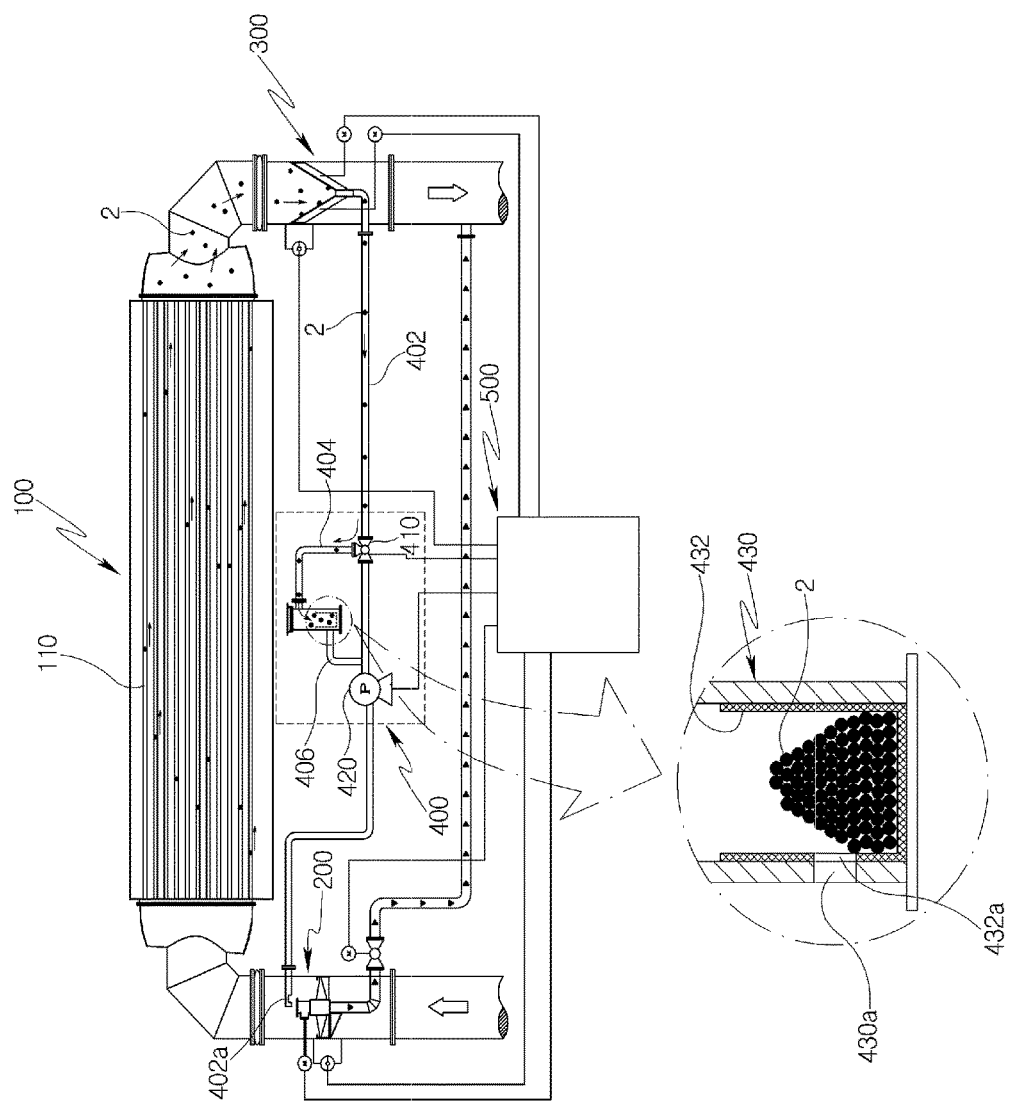
FIG. 5 is a plan view illustrating a state in which cleaning balls are collected in the condenser tube cleaning apparatus according to the first embodiment of the present disclosure.

Referring to FIG. 5, after the cleaning of the condenser unit 100 is fully completed, the controller 500 controls the direction of the first valve 410 and allows the pump unit 420 to be turned off such that all of the cleaning balls 2 are collected in the collection unit 430. In this case, since all of the cleaning balls 2 are stably moved toward the inner region of the collection unit 430 through the first supply pipe 404, damage to the cleaning balls 2 due to the collection thereof can be reduced or prevented and the stability thereof can be enhanced.

Figure 6:
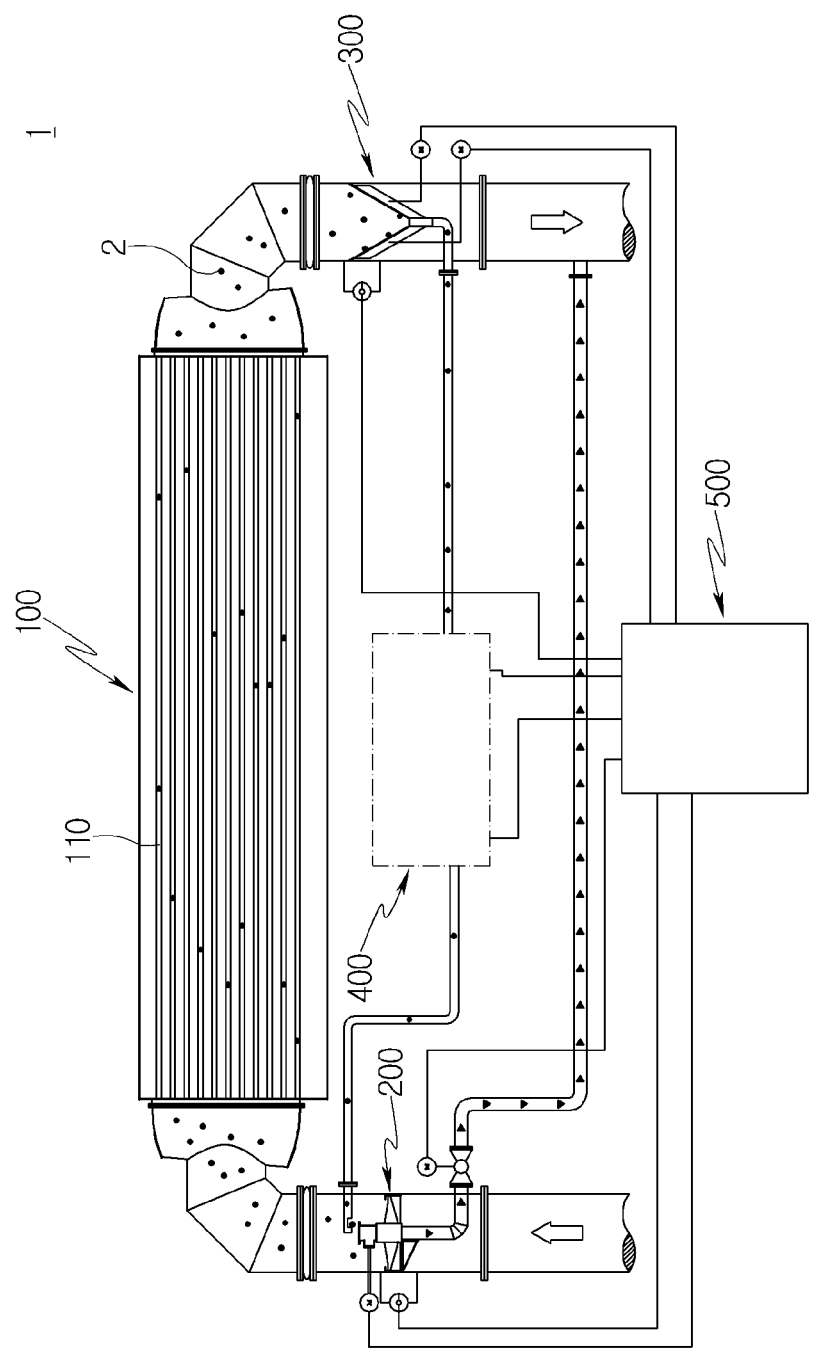
FIG. 6 is a plan view illustrating a condenser tube cleaning apparatus according to a second embodiment of the present disclosure.
Figure 7:
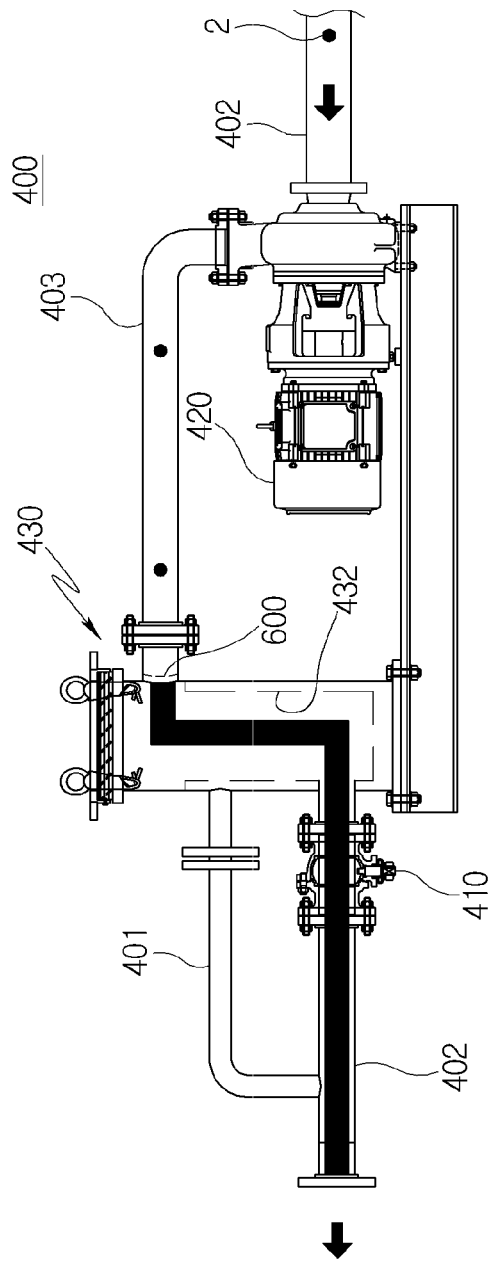
FIG. 7 is a view illustrating a reducer according to the second embodiment of the present disclosure.
Figure 8:
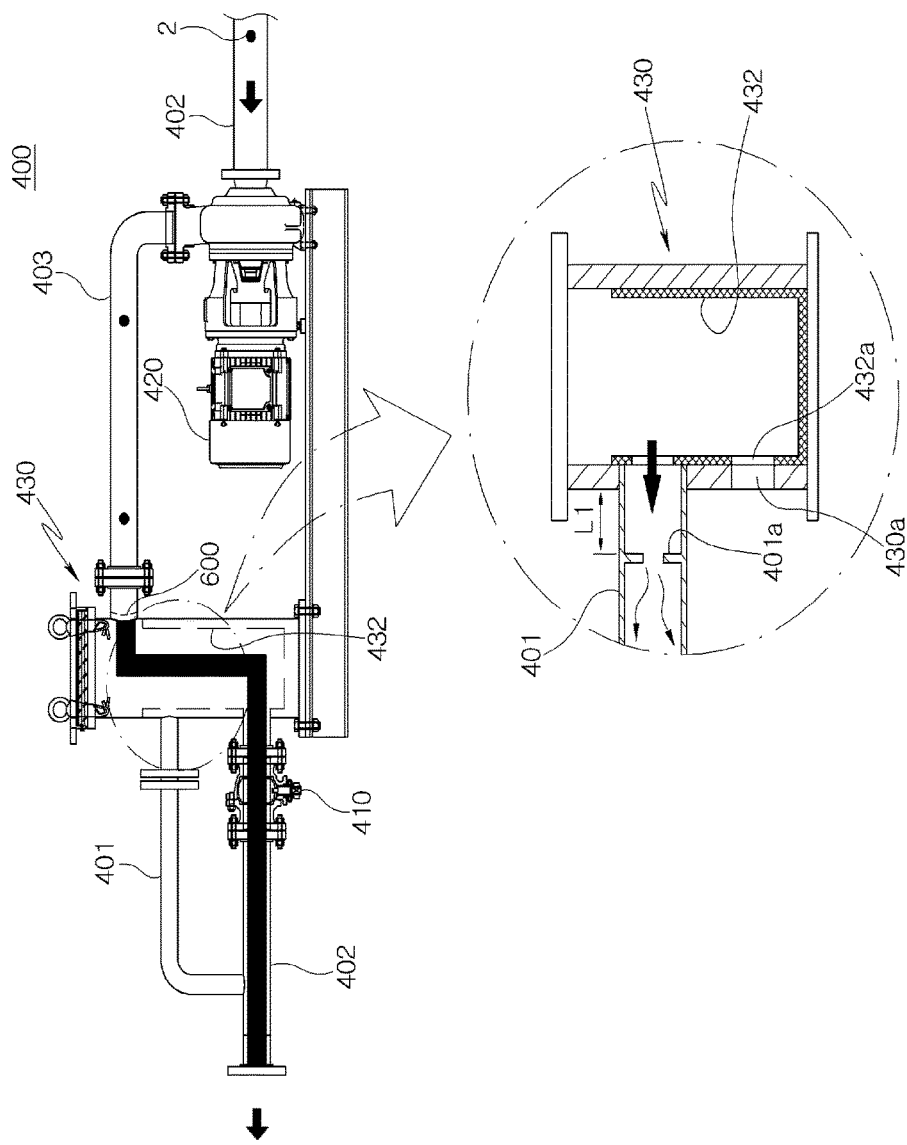
FIG. 8 is a plan view illustrating a state in which cleaning balls are collected in the condenser tube cleaning apparatus according to the second embodiment of the present disclosure.

Hereinafter, a condenser tube cleaning apparatus according to a second embodiment of the present disclosure will be described with reference to the accompanying drawings. FIG. 6 is a view illustrating the condenser tube cleaning apparatus according to the second embodiment of the present disclosure. FIG. 7 is a view illustrating a reducer according to the second embodiment of the present disclosure. FIG. 8 is a view illustrating a state in which cleaning balls are collected in the condenser tube cleaning apparatus according to the second embodiment of the present disclosure.

The second embodiment differs from the above first embodiment in that the flow of coolant is guided to mainly move through a first transfer pipe 402, which will be described later, with the consequence that a large number of cleaning balls 2 are stably circulated along the first transfer pipe 402 together with coolant.

Referring to FIGS. 6 to 8, the condenser tube cleaning apparatus, which is designated by reference numeral 1, according to the second embodiment of the present disclosure includes a condenser unit 100, a foreign substance removal unit 200, a strainer unit 300, a ball collection unit 400, sensors 440, and a controller 500.

The condenser unit 100 includes a plurality of unit tubes 110 which are axially arranged in the inner region thereof, and a large quantity of coolant and cleaning balls 2 move together along the unit tubes 110 so that foreign substances accumulated in the tubes 110 are removed. Accordingly, the foreign substances accumulated in the tubes 110 are separated from the inside thereof by the repeated movement of the cleaning balls 2, thereby stabilizing the heat exchange efficiency of the condenser unit 100.

In other words, on the basis of the flow direction of coolant, after the foreign substances contained in the coolant are filtered by the foreign substance removal unit 200, the coolant is supplied to the condenser unit 100 together with the cleaning balls 2.

The coolant passes through the unit tubes 110 and moves downward in the strainer unit 300. The cleaning balls 2 move to the ball collection unit 400 through a first transfer pipe 402 which will be described later.

The ball collection unit 400 is operated such that the cleaning balls are supplied to the upper portion of the foreign substance removal unit 200 three times a day so as to clean the condenser unit 100. For example, the cleaning balls are circulated for 2 hours to clean the condenser unit 100, and are maintained for 6 hours in the state in which they are collected in the ball collection unit 400.

Accordingly, the ball collection unit 400 accomplishes the removal of foreign substances accumulated in the unit tubes 110 while the cleaning balls 2 are repeatedly circulated and collected three times a day on a cycle of 8 hours in total.

Coolant moves from bottom to top in the foreign substance removal unit 200, and the foreign substance removal unit 200 includes a wire mesh to filter foreign substances contained in the coolant, thereby enabling the foreign substances to be minimally moved to the unit tubes 110.

The strainer unit 300 is supplied with the cleaning balls 2 and the coolant, which pass through the condenser unit 100, and the cleaning balls 2 move to the ball collection unit 400 while the coolant moves downward of the strainer unit 300.

The ball collection unit 400 includes a first valve 410 installed at any position on the path of the first transfer pipe 402, one end of which is connected to the strainer unit 300 while the other end thereof extends to the upper portion of the foreign substance removal unit 200, a pump unit 420 which is spaced apart from the first valve 410 and is installed on the first transfer pipe 402 so as to supply the cleaning balls 2 passing through the first valve 410 to the foreign substance removal unit 200, and a collection unit 430 which is located between the first valve 410 and the pump unit 420 to collect the cleaning balls 2 depending on the switching of the first valve 410.

The first valve 410 is a 2-way valve, and the direction of the 2-way valve is switched by the controller 500. For example, the controller 500 controls the direction of the 2-way valve such that a large number of cleaning balls 2 are moved to the foreign substance removal unit 200 in order to supply the cleaning balls 2 to the foreign substance removal unit 200.

In this case, the cleaning balls 2 are moved to the foreign substance removal unit 200 through the first transfer pipe 402 via the collection unit 430 by the pumping force of the pump unit 420, and drop downward from the upper portion of the foreign substance removal unit 200. Then, the cleaning balls 2 are stably moved toward the unit tubes 110 included in the condenser unit 100.

The ball collection unit 400 includes a second transfer pipe 401, one end of which is connected to the outside of the collection unit 430 while the other end thereof is connected to any position of the first transfer pipe 402 spaced apart from the first valve 410. The second transfer pipe 401 has a smaller diameter than the first transfer pipe 402.

The second transfer pipe 401 has a relatively smaller diameter than the first transfer pipe 402. For example, the second transfer pipe 401 has such a diameter that each individual cleaning ball 2 passes through the second transfer pipe 401.

The second transfer pipe 401 is configured such that, when the cleaning balls 2 is circulated via the condenser unit 100, the cleaning balls 2 move along the first transfer pipe 402 together with coolant by guiding the main flow of coolant to the first transfer pipe 402 due to a difference between the diameters of the first and second transfer pipe 402 and 401.

In this case, since the cleaning balls 2 move through the first transfer pipe 402, they may be easily moved. As described above, the second transfer pipe 401 has a diameter equal to or smaller than the diameter of each cleaning ball 2 for allowing only the flow of coolant. Therefore, most coolant moves through the first transfer pipe 402 located at the lower side of the ball collection unit 400.

The second transfer pipe 401 may mainly guide the flow of coolant to the first transfer pipe 402 in the ball collection unit 400, without a separate valve installed thereon, and the flow of the cleaning balls may therefore be guided at low cost.

Since the first transfer pipe 402 has a larger diameter than the second transfer pipe 401, it is advantageous to move a large quantity of coolant and a large number of cleaning balls 2. However, since the second transfer pipe 401 has a relatively smaller diameter than the first transfer pipe 402, only a small quantity of coolant flows through the second transfer pipe 401 and a difference in flow rate occurs between the first transfer pipe 402 and the second transfer pipe 401.

Accordingly, when the cleaning balls 2 are circulated, the cleaning balls 2 are stably moved through the first transfer pipe 402 through which most coolant flows.

The collection unit 430 is located between the first valve 410 and the pump unit 420, and collects the cleaning balls 2 depending on the switching of the first valve 410. The collection unit 430 has a cylindrical shape and includes a screen mesh 432 therein.

The screen mesh 432 has a wire mesh structure in order to filter foreign substances contained in coolant, and has a shape corresponding to the inside of the collection unit 430 so as to filter foreign substances contained in coolant. In addition, the screen mesh 432 and the collection unit 430 have opening portions 432a and 430a which are opened on the same line at the respective sides thereof such that the cleaning balls 2 are transferred to the pump unit 420.

The opening portions 432a and 430a are opened on the same line. Therefore, the cleaning balls 2 may be stably moved, thereby preventing the flow of the cleaning balls 2 from being blocked in a specific portion.

The second transfer pipe 401 is connected to the outer upper portion of the collection unit 430, and a vertical height difference between the first and second transfer pipes 402 and 401 is maintained.

The ball collection unit 400 further includes a connection pipe 403, one end of which is connected to the outlet of the pump unit 420 while the other end thereof is connected to the collection unit 430, and the connection pipe 403 is connected to the outer upper portion of the collection unit 430.

A backflow prevention trap 600 is installed at the connection portion between the connection pipe 403 and the first transfer pipe 402 in order to prevent the cleaning balls 2 from flowing back to the pump unit 420 when the cleaning balls 2 are transferred to the collection unit 430.

The backflow prevention trap 600 is opened and closed such that the cleaning balls 2 contained in coolant are moved only to the collection unit 430. Therefore, the cleaning balls 2, which are moving from the pump unit 420 to the collection unit 430, is prevented from flowing back to the pump unit 420.

Accordingly, the cleaning balls 2 may be always moved only to the collection unit 430, the stable supply of the cleaning balls 2 may be improved because the case where the cleaning balls 2 are not supplied to the collection unit 430 does not occur, and the condenser unit 100 may be stably cleaned using the cleaning balls 2.

In addition, even when the pump unit 420 malfunctions, the cleaning balls 2 are stably moved in a predetermined direction without flowing back to the collection unit 430.

In the embodiment, the controller 500 (see FIG. 2) controls the first valve 410 such that the first valve 410 is opened in order to move the cleaning balls 2 to the condenser unit 100, and such that the first valve 410 is closed when the cleaning balls 2 are collected in the collection unit 430. In this case, a large quantity of coolant may move through the first valve 410, and thus the cleaning balls 2 are stably moved together with the coolant.

In addition, the number of cleaning balls counted by a counting unit 700 is transmitted to the controller 500, and the controller 500 may allow the current number of cleaning balls collected in the collection unit 430 or the number of cleaning balls through the first transfer pipe 402 to be measured using the counting unit 700. For reference, the counting unit 700 is installed in the collection unit 430 or on the first transfer pipe 402.

The sensors 440 detect the pressure and amount of coolant which is supplied to the condenser unit 100 via the foreign substance removal unit 200. For example, a pressure sensor (not shown) and a flow sensor (not shown) are used as the sensors 440.

The pressure sensor and the flow sensor are each located beneath and above the foreign substance removal unit 200, and detect the pressure and flow rate of coolant before and after the coolant passes through the foreign substance removal unit 200 so as to transmit the same to the controller 500. The controller 500 selectively controls the supply time and amount of the cleaning balls 2 in response to the pressure or amount of coolant transmitted from the sensors.

For example, when the pressure of the coolant is increased, the controller 500 determines that foreign substances are accumulated in the unit tubes 110 of the condenser unit 100, and allows the pump unit to be turned on such that the cleaning balls 2 stored in the ball collection unit 400 are supplied to the foreign substance removal unit 200 in order to circulate the cleaning balls 2.

When the amount of the coolant supplied to the foreign substance removal unit 200 is increased, the controller 500 allows the rpm of the pump unit 420 to be increased in order to increase the supply cycle of the cleaning balls 2. In this case, since the cleaning balls 2 are supplied in proportion to the increased amount of the coolant, the foreign substances accumulated in the condenser unit 100 may be stably removed.

Accordingly, the cleaning balls 2 may be controlled to be proportionally supplied depending on variation in the amount of coolant by the controller 500, and it is thus possible to stably cope with a lot of variables.

Since the second transfer pipe 401 is formed such that coolant does not mainly flow therethrough, but rather only a small quantity of coolant flows therethrough, the second transfer pipe 401 may have a diameter equal to or smaller than each individual cleaning ball 2.

In addition, when the diameter of the cleaning ball 2 is "D", the second transfer pipe 401 may have a diameter within 10% of the diameter D. For example, when the diameter D of the cleaning ball 2 is 20 mm, the second transfer pipe 401 has a diameter of 22 mm.

The second transfer pipe 401 is provided with a reducer 401a, the diameter of which is decreased toward the center of the second transfer pipe in the inward longitudinal direction of a first section L1 extending outward from the connection portion with the collection unit 430.

The reducer 401a serves to intentionally minimize the flow of fluid moving to the second transfer pipe 401, thereby enabling most coolant to flow through the first transfer pipe 402. Therefore, a large number of cleaning balls 2 may be stably circulated.

Figure 9:
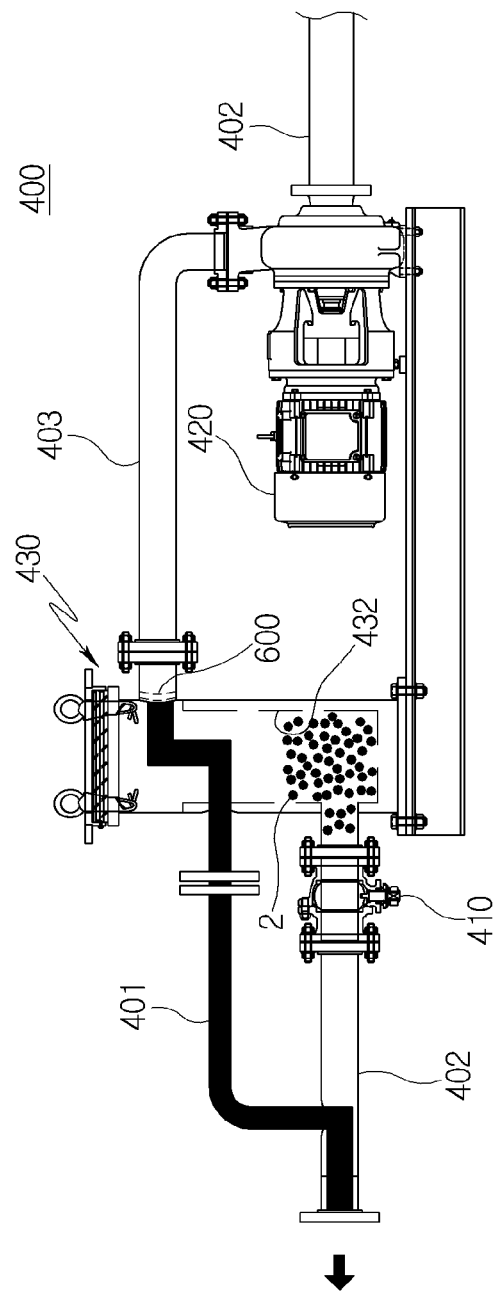
FIG. 9 is a view illustrating a state in which cleaning balls are collected in the condenser tube cleaning apparatus according to the second embodiment of the present disclosure.

Referring to FIG. 9, after the cleaning of the condenser unit 100 is completed, the controller 500 allows the cleaning balls to be guided to the collection unit 430 for the collection thereof. The controller 500 controls the operation of the pump unit 420 such that it is turned off, and the supply of the cleaning balls 2 to the foreign substance removal unit 200 is stopped.

When the controller 500 controls the first valve 410 such that it is closed in order to collect the cleaning balls 2, the cleaning balls 2 are collected in the collection unit 430. In this case, coolant moves only to the second transfer pipe 401, and a large number of cleaning balls 2 are maintained in the state in which they are collected in the collection unit 430.

The operation of the pump unit 420 is controlled by the controller 500, and the pump unit 420 may consist of a single pump unit or a plurality of pump units. When the rpm of the pump unit 420 is selectively controlled, the supply of the cleaning balls 2 to the condenser unit 100 may be differently controlled.

For example, when it is necessary to supply a large number of cleaning balls 2 to the condenser unit 100, the rpm of the pump unit 420 is controlled to be increased by the controller 500. In addition, the pump unit 420 is controlled to operate at a preset rpm unless any abnormality is detected.

Hereinafter, a condenser tube cleaning apparatus according to a third embodiment of the present invention will be described with reference to the accompanying drawings.

Figure 10:
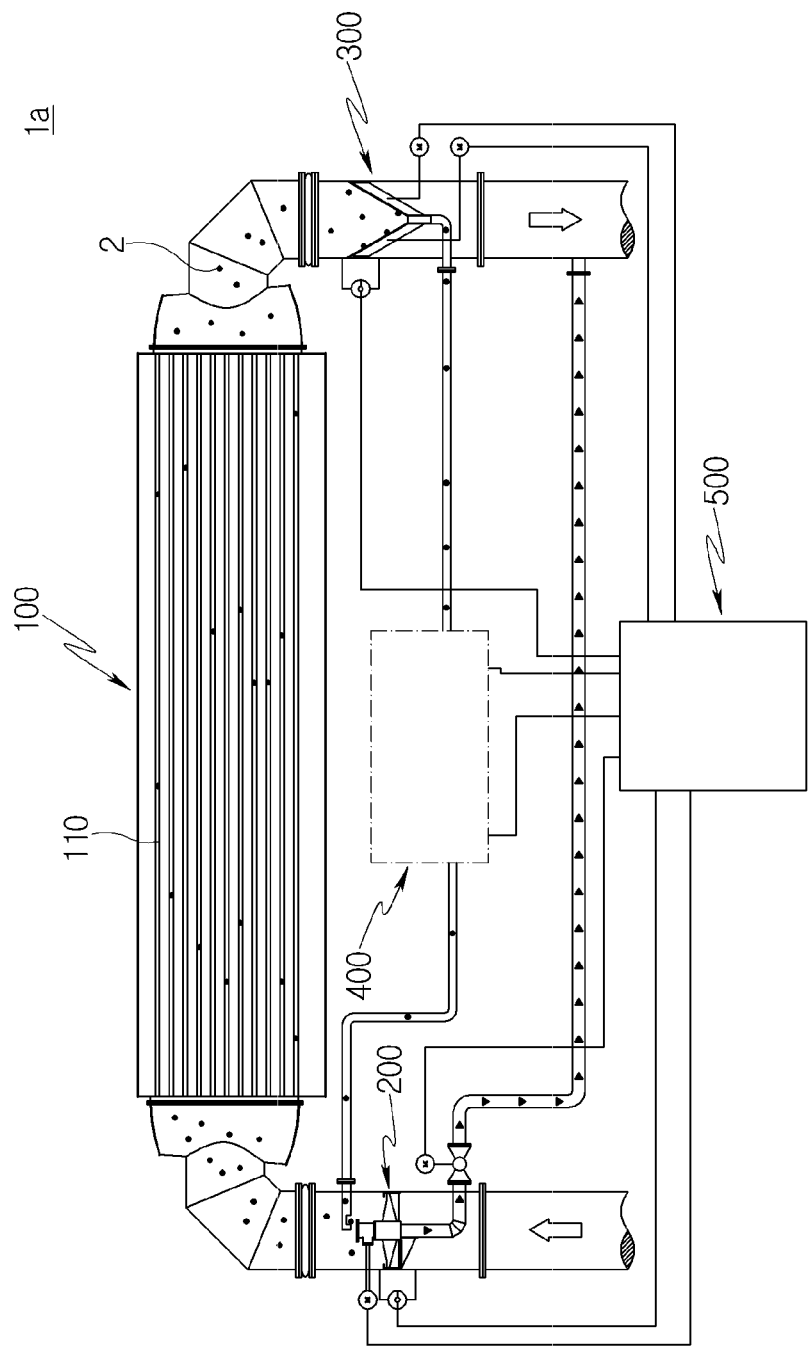
FIG. 10 is a view illustrating a condenser tube cleaning apparatus according to a third embodiment of the present disclosure.
Figure 11:
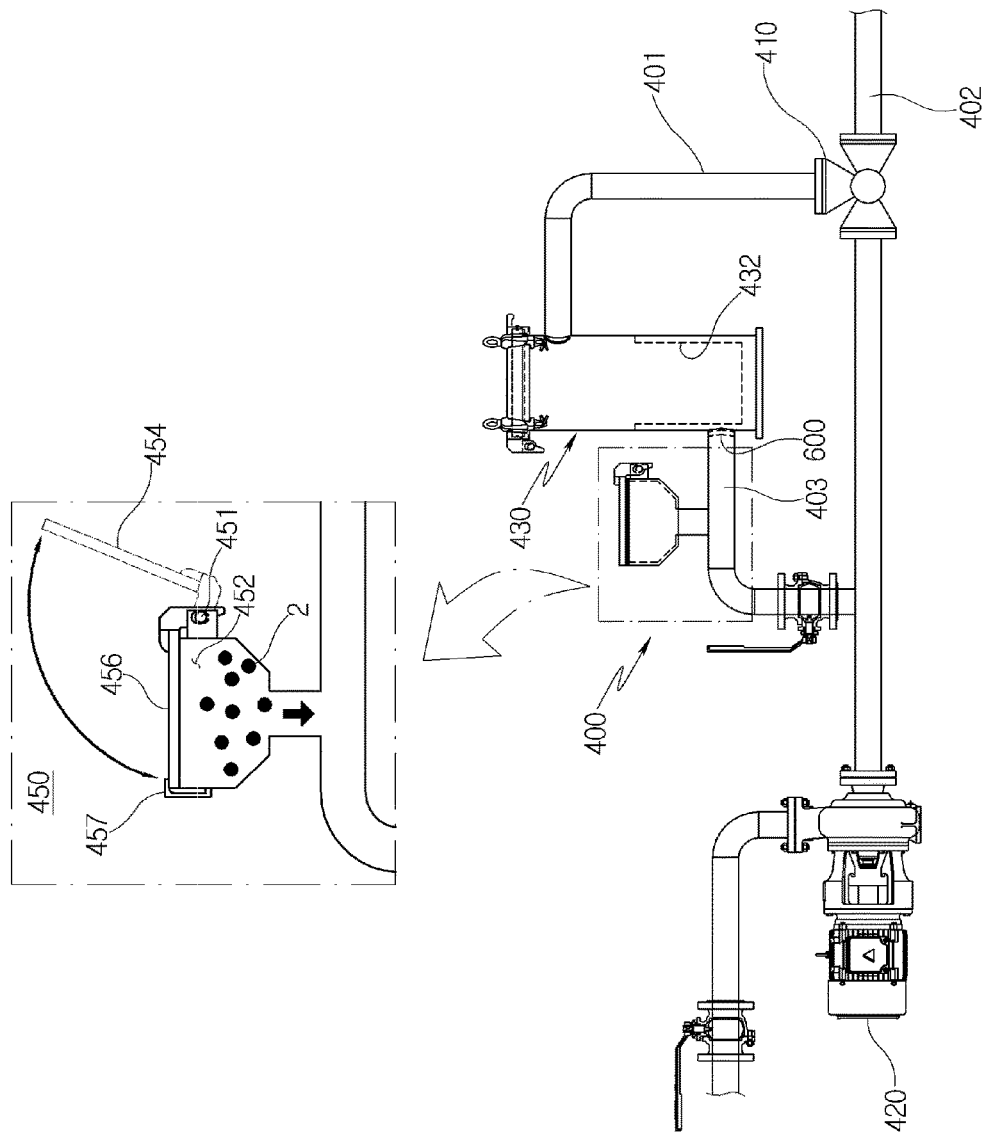
FIG. 11 is a view illustrating a feeding part according to the third embodiment of the present disclosure.

Referring to FIGS. 10 and 11, the condenser tube cleaning apparatus, which is designated by reference numeral 1a, according to the third embodiment of the present invention includes a condenser unit 100, a foreign substance removal unit 200, a strainer unit 300, a ball collection unit 400, sensors 440, and a controller 500. For reference, since the above components are similar to those in the first embodiment, only limited critical components will be described in detail or only components and operations different from those in the first embodiment will be described.

The condenser tube cleaning apparatus 1a includes a condenser unit 100 having a plurality of unit tubes 110 in the inner region thereof, a foreign substance removal unit 200 located at the inlet side of the condenser unit 100 to remove foreign substances that are contained in coolant supplied to the condenser unit 100, a strainer unit 300 configured to sort the coolant passing through the condenser unit 100 into coolant and a large number of cleaning balls 2 included therein, and a ball collection unit 400 configured to collect the cleaning balls 2 passing through the strainer unit 300.

The ball collection unit 400 includes a first valve 410 installed at any position on the path of a first transfer pipe 402, one end of which is connected to the strainer unit 300 while the other end thereof extends to the upper portion of the foreign substance removal unit 200, a pump unit 420 which is spaced apart from the first valve 410 and is installed on the first transfer pipe 402 so as to supply the cleaning balls 2 passing through the first valve 410 to the foreign substance removal unit 200, and a collection unit 430 which is located between the first valve 410 and the pump unit 420 to collect the cleaning balls 2 depending on the switching of the first valve 410.

The ball collection unit 400 further includes a connection pipe 403, one end of which is connected to the outlet of the pump unit 420 while the other end thereof is connected to the collection unit 430, and a feeding part 450 provided to additionally feed separate cleaning balls 2 from the cleaning balls 2 circulated in the condenser unit 100. The feeding part 450 has a feeding port 452, one end of which is connected to any position of the connection pipe 403 while the other end thereof is opened upward.

The feeding part 450 may serve to feed separate cleaning balls 2 from the pre-fed cleaning balls 2 through the feeding port 452 in order to more efficiently clean the condenser unit 100. Accordingly, an operator may conveniently feed other cleaning balls on the spot when it is difficult to continuously use the existing cleaning balls 2 due to the deformation or damage thereof. Therefore, the cleaning efficiency of the condenser unit 100 can be improved.

The feeding part 450 is formed at the upper end of a feeding pipe extending outward from the connection pipe 403 such that the cleaning balls fed into the feeding part 450 are moved through the connection pipe 403, and has one of a semicircular shape and a conical shape.

The feeding part 450 further includes a cover 454 which is opened and closed by rotating about a hinge 451 provided on the upper surface of the feeding port 452. The cover 454 includes a transparent check window 456 to observe the inside of the feeding port 452 from the outside.

The operator may usually observe the inside of the feeding port 452 with the naked eye through the check window 456, and therefore it is possible to more accurately recognize whether or not abnormality occurs.

The cover 454 further includes a fixing member 457 provided to selectively fix the cover 454 to the feeding port 452. The fixing member 457 comes into close contact with the upper surface of the feeding port 452, thereby preventing the leakage of coolant to the outside.

The feeding part 450 is provided with a cleaning ball storage tank (not shown) which stores a large number of cleaning balls to immediately feed the cleaning balls on the spot. When additional feeding is required on the spot, the operator may immediately feed the cleaning balls stored in the cleaning ball storage tank without separately moving. Accordingly, since the movement line of the operator is minimized, it is possible to reduce a time required to additionally feed cleaning balls and to improve cleaning efficiency.

The first valve 410 is a 3-way valve, and the direction of the 3-way valve is switched by the controller 500. For example, the controller 500 controls the direction of the 3-way valve such that a large number of cleaning balls 2 are moved to the foreign substance removal unit 200 in order to supply the cleaning balls 2 to the foreign substance removal unit 200.

The ball collection unit 400 includes a second transfer pipe 401, one end of which is connected to the outer upper portion of the collection unit 430 while the other end thereof is connected to the first valve 410.

The collection unit 430 is located between the first valve 410 and the pump unit 420, and collects the cleaning balls 2 depending on the switching of the first valve 410. The collection unit 430 has a cylindrical shape and includes a screen mesh 432 therein.

The screen mesh 432 has a wire mesh structure in order to filter foreign substances contained in coolant, and has a shape corresponding to the inside of the collection unit 430 so as to filter foreign substances contained in coolant. In addition, the screen mesh 432 and the collection unit 430 have opening portions 432a and 430a (being equal to those illustrated in FIG. 3) which are opened on the same line at the respective sides thereof such that the cleaning balls 2 are transferred to the pump unit 420.

The opening portions 432a and 430a are opened on the same line. Therefore, the cleaning balls 2 may be stably moved, thereby preventing the flow of the cleaning balls 2 from being blocked in a specific portion.

A backflow prevention trap 600 is installed at the connection portion between the collection unit 430 and the connection pipe 403 in order to prevent the cleaning balls 2 from flowing backward when the cleaning balls 2 are transferred from the collection unit 430 to the pump unit 420.

The cleaning balls 2 may be stably moved by the backflow prevention trap 600, the stable supply of the cleaning balls 2 to the collection unit 430 may be improved, and the condenser unit 100 may be stably cleaned using the cleaning balls 2.

In addition, even when the pump unit 420 malfunctions, the cleaning balls 2 are stably moved in a predetermined direction without flowing back to the collection unit 430.

In the embodiment, the controller 500 controls the first valve 410 such that the first valve 410 is opened in order to move the cleaning balls 2 to the condenser unit 100, and allows the direction of the first valve 410 to be switched when the cleaning balls 2 are collected in the collection unit 430. In this case, a large quantity of coolant may move through the first valve 410, and thus the cleaning balls 2 are stably moved together with the coolant.

The sensors 440 (see FIG. 2) detect the pressure and amount of coolant which is supplied to the condenser unit 100 via the foreign substance removal unit 200. For example, a pressure sensor (not shown) and a flow sensor (not shown) are used as the sensors 440.

The pressure sensor and the flow sensor are each located beneath and above the foreign substance removal unit 200, and detect the pressure and flow rate of coolant before and after the coolant passes through the foreign substance removal unit 200 so as to transmit the same to the controller 500 (see FIG. 2). The controller 500 selectively controls the supply time and amount of the cleaning balls 2 in response to the pressure or amount of coolant transmitted from the sensors.

For example, when the pressure of the coolant is increased, the controller 500 determines that foreign substances are accumulated in the unit tubes 110 of the condenser unit 100, and allows the pump unit to be turned on such that the cleaning balls 2 stored in the ball collection unit 400 are supplied to the foreign substance removal unit 200 in order to circulate the cleaning balls 2.

When the amount of the coolant supplied to the foreign substance removal unit 200 is increased, the controller 500 allows the rpm of the pump unit 420 to be increased in order to increase the supply cycle of the cleaning balls 2. In this case, since the cleaning balls 2 are supplied in proportion to the increased amount of the coolant, the foreign substances accumulated in the condenser unit 100 may be stably removed.

Accordingly, the cleaning balls 2 may be controlled to be proportionally supplied depending on variation in the amount of coolant by the controller 500, and it is thus possible to stably cope with a lot of variables.

The operation of the pump unit 420 is controlled by the controller 500, and the pump unit 420 may consist of a single pump unit or a plurality of pump units. When the rpm of the pump unit 420 is selectively controlled, the supply of the cleaning balls 2 to the condenser unit 100 may be differently controlled.

For example, when it is necessary to supply a large number of cleaning balls 2 to the condenser unit 100, the rpm of the pump unit 420 is controlled to be increased by the controller 500. In addition, the pump unit 420 is controlled to operate at a preset rpm unless any abnormality is detected.

Hereinafter, a condenser tube cleaning apparatus according to a fourth embodiment of the present invention will be described with reference to the accompanying drawings.

Figure 12:
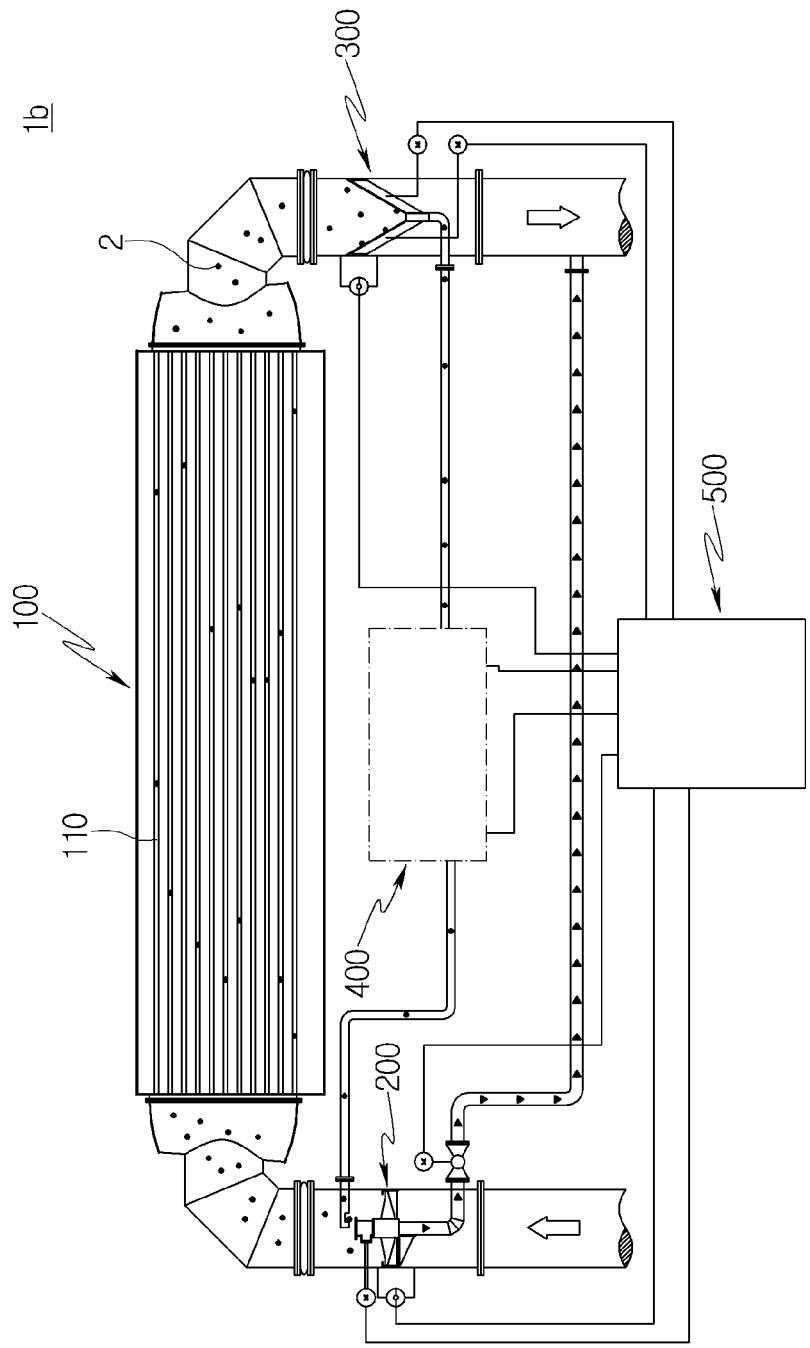
FIG. 12 is a view illustrating a condenser tube cleaning apparatus according to a fourth embodiment of the present disclosure.
Figure 13:
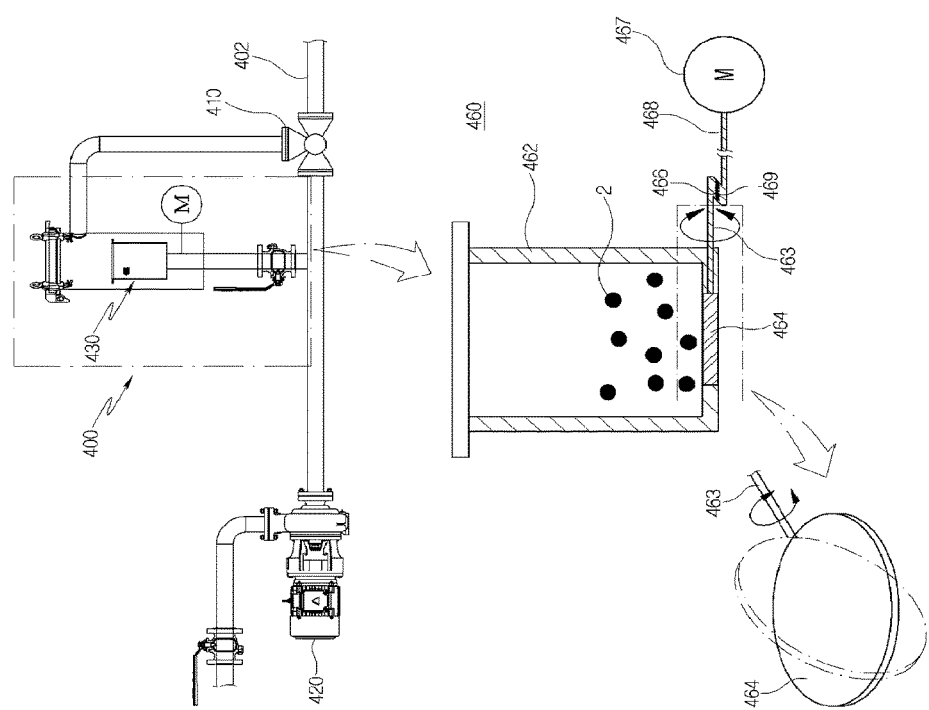
FIG. 13 a view illustrating a cleaning ball supply unit of the condenser tube cleaning apparatus according to the fourth embodiment of the present disclosure.

Referring to FIGS. 12 and 13, the condenser tube cleaning apparatus, which is designated by reference numeral 1b, according to the fourth embodiment of the present invention includes a condenser unit 100, a foreign substance removal unit 200, a strainer unit 300, a ball collection unit 400, sensors 440, and a controller 500. For reference, since the above components are similar to those in the first embodiment, only limited critical components will be described in detail or only components and operations different from those in the first embodiment will be described.

Particularly, since the condenser tube cleaning apparatus 1b according to the present embodiment includes a cleaning ball supply unit 460, cleaning balls 2 may be selectively supplied to a pump unit 420 through the cleaning ball supply unit 460 depending on the collected amount of the cleaning balls 2. Therefore, the cleaning efficiency of the condenser unit 100 can be improved.

To this end, the condenser tube cleaning apparatus 1b includes a condenser unit 100 having a plurality of unit tubes 110 in the inner region thereof, a foreign substance removal unit 200 located at the inlet side of the condenser unit 100 to remove foreign substances that are contained in coolant supplied to the condenser unit 100, a strainer unit 300 configured to sort the coolant passing through the condenser unit 100 into coolant and a large number of cleaning balls 2 included therein, and a ball collection unit 400 configured to collect the cleaning balls 2 passing through the strainer unit 300.

The ball collection unit 400 includes a first valve 410 installed at any position on the path of a first transfer pipe 402, one end of which is connected to the strainer unit 300 while the other end thereof extends to the upper portion of the foreign substance removal unit 200, a pump unit 420 which is spaced apart from the first valve 410 and is installed on the first transfer pipe 402 so as to supply the cleaning balls 2 passing through the first valve 410 to the foreign substance removal unit 200, and a collection unit 430 which is located between the first valve 410 and the pump unit 420 to collect the cleaning balls 2 depending on the switching of the first valve 410.

The cleaning ball supply unit 460 is located inside the collection unit 430, and has a shape corresponding to the inside of the collection unit 430. The cleaning ball supply unit 460 selectively supplies the cleaning balls 2 to the pump unit 420 depending on the collected amount of the cleaning balls 2.

The cleaning ball supply unit 460 includes an auxiliary collection container 462 provided inside the collection unit 430, a switching port 464 which is located on the lower surface of the auxiliary collection container 462 and provided through a rotary shaft 463 so as to be opened and closed toward the inside bottom of the collection unit 430, a first gear 466 which is longitudinally formed on the outer peripheral surface of the rotary shaft 463 spaced outward from the switching port 464, and a gear shaft 468, one end of which is axially inserted into an auxiliary motor 467 located outside the collection unit 430 while the other end thereof is formed with a second gear 469 engaged with the first gear 466, for rotating the switching port 464.

The auxiliary collection container 462 is located at the inner lower end of the collection unit, and has a cylindrical shape. The switching port 464 may have a plate shape or another shape.

One end of the rotary shaft 463 is fixed to the lower surface of the switching port 464, and the other end thereof horizontally extends outward. The first gear 466 is formed at the extended end of the rotary shaft 463. The first gear 466 may be, for example, a helical gear, or may be another gear.

The auxiliary motor 467 is located outside the collection unit 430, and the gear shaft 468 extends toward the switching port 464. The second gear 469 is formed at the extended end of the gear shaft 468, and engages with the first gear 466. For example, when the auxiliary motor 467 is controlled by the controller 500, the gear shaft 468 rotates, and the rotary force of the gear shaft is transferred to the first gear 466 engaged with the second gear 469. Finally, when the rotary shaft 463, on which the first gear 466 is formed, rotates, the switching port 464 is rotated so as to be changed from a horizontal state to a vertical state, thereby allowing the cleaning balls 2 to be supplied to the pump unit 420 through the first transfer pipe 402.

Thus, when it is necessary to supply additional cleaning balls, the cleaning balls may be automatically and stably supplied regardless of an operator. Therefore, it is possible to improve the cleaning efficiency of the condenser unit 100.

As is apparent from the above description, in accordance with exemplary embodiments of the present invention, a large number of cleaning balls can be stably circulated and supplied by a condenser tube cleaning apparatus. Therefore, a condenser unit can have improved efficiency.

In addition, since the cleaning balls are controlled to be dispersed and supplied at a certain time interval when they are supplied to a foreign substance removal unit, it is possible to improve the stable supply of the cleaning balls. Through such a structure, it is possible to prevent the cleaning balls from intensively dropping only at a specific position.

Furthermore, when it is necessary to feed additional cleaning balls, the additional cleaning balls can be immediately fed on the spot without stopping the operation of the condenser tube cleaning apparatus. Therefore, it is possible to improve efficiency in cleaning the condenser unit.

While the present disclosure has been described with respect to the specific embodiments, it will be apparent to those skilled in the art that various changes and modifications may be made without departing from the spirit and scope of the invention as defined in the following claims.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A condenser tube cleaning apparatus, comprising:
    a condenser unit having a plurality of unit tubes in an inner region thereof;
    a foreign substance removal unit that is located at an inlet side of the condenser unit and includes a wire mesh to filter out foreign substances contained in coolant supplied to the condenser unit;
    a strainer unit configured to sort the coolant passing through the condenser unit into coolant and cleaning balls; and
    a ball collection unit configured to collect the cleaning balls passing through the strainer unit, wherein the ball collection unit includes:
        a 3-way valve disposed on a path of a first transfer pipe, a first end of the first transfer pipe being coupled to the strainer unit, and a second end of the first transfer pipe extends to an upper portion of the foreign substance removal unit, the valve configured to switch between a first state defining a first fluid path and a second state defining a second fluid path;
        a pump unit spaced apart from the valve and disposed on the first transfer pipe so as to supply the cleaning balls passing through the valve to the foreign substance removal unit;
        a collection unit that is disposed between the valve and the pump unit and includes a cylindrical cavity to collect the cleaning balls when the valve is in the first state; and
        wherein the first fluid path travels from the valve to the pump through the collection unit, and the second fluid path travels from the valve to the pump bypassing the collection unit.

2. The condenser tube cleaning apparatus according to claim 1, further comprising:

a first supply pipe, a first end of the first supply pipe being coupled to the first valve, a second end of the first supply pipe being coupled to an outer upper portion of the collection unit; and a second supply pipe, a first end of the second supply pipe being coupled to an outer lower portion of the collection unit, and a second end of the second supply pipe being coupled to the first transfer pipe at a location between the pump unit and the valve.

3. The condenser tube cleaning apparatus according to claim 1, wherein:

the first transfer pipe includes a plurality of outlets extending to the upper portion of the foreign substance removal unit and being opened toward the upper portion of the foreign substance removal unit;

a separation plate is longitudinally arranged at an inner center of the other end of the first transfer pipe; and the outlets include a first outlet opened at one side with respect to the separation plate and a second outlet opened at an other end with respect to the separation plate.

4. The condenser tube cleaning apparatus according to claim 1, further comprising:

a sensor configured to detect a pressure and an amount of the coolant supplied to the condenser unit via the foreign substance removal unit; and a controller configured to selectively control a supply time and a supply amount of the cleaning balls in response to the pressure or amount of the coolant detected by the sensor.

5. The condenser tube cleaning apparatus according to claim 4, wherein:

the controller is configured to determine that foreign substances are accumulated in the unit tubes of the condenser unit and to turn on the pump unit on such that the cleaning balls stored in the ball collection unit are supplied to the foreign substance removal unit when the pressure of the coolant is increased; and the controller is configured to increase an rpm of the pump unit increase a supply cycle of the cleaning balls when the amount of the coolant supplied to the foreign substance removal unit is increased.

6. The condenser tube cleaning apparatus according to claim 1, wherein the collection unit further includes a screen mesh having a shape corresponding to the cylindrical cavity, and wherein the screen mesh and the collection unit each have a first opening in an upper portion of the collection unit through which the cleaning balls enter the cylindrical cavity and a second opening in a lower portion of the collection unit through which the cleaning balls exit the cylindrical cavity.

* * * * *